United States Patent
Engelbart et al.

(10) Patent No.: US 7,807,002 B2
(45) Date of Patent: *Oct. 5, 2010

(54) VERIFICATION OF TOW CUT FOR AUTOMATIC FIBER PLACEMENT

(75) Inventors: Roger W. Engelbart, St. Louis, MO (US); Reed Hannebaum, Belleville, IL (US)

(73) Assignee: The Boeing Company, Chicago, IL (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/957,649

(22) Filed: Dec. 17, 2007

(65) Prior Publication Data

US 2009/0153847 A1 Jun. 18, 2009

(51) Int. Cl.
*B32B 37/00* (2006.01)

(52) U.S. Cl. .................. 156/64; 156/350; 156/351; 156/353; 156/366; 156/378; 156/379

(58) Field of Classification Search .................. 156/64, 156/350, 351, 353, 366, 378, 379
See application file for complete search history.

(56) References Cited

U.S. PATENT DOCUMENTS

| | | | |
|---|---|---|---|
| 5,472,553 A * | 12/1995 | Roberts | 156/353 |
| 6,799,619 B2 | 10/2004 | Holmes et al. | |
| 6,814,822 B2 | 11/2004 | Holmes et al. | |
| 6,871,684 B2 | 3/2005 | Engelbart et al. | |
| 7,039,485 B2 | 5/2006 | Engelbart et al. | |
| 7,171,033 B2 | 1/2007 | Engelbart et al. | |
| 7,193,696 B2 | 3/2007 | Engelbart et al. | |
| 7,236,625 B2 | 6/2007 | Engelbart et al. | |
| 7,435,947 B2 * | 10/2008 | Engelbart et al. | 250/231.15 |
| 2002/0141632 A1 * | 10/2002 | Engelbart et al. | 382/141 |
| 2004/0188025 A1 * | 9/2004 | Anderson et al. | 156/382 |
| 2005/0225753 A1 * | 10/2005 | Engelbart et al. | 356/237.1 |
| 2007/0068540 A1 * | 3/2007 | Thomas et al. | 131/88 |

* cited by examiner

*Primary Examiner*—Kat Wyrozebski
*Assistant Examiner*—Joshel Rivera
(74) *Attorney, Agent, or Firm*—Tung & Associates (57) ABSTRACT

The operation of tow cutters in an automatic fiber placement machine are monitored to determine if inconsistencies in fiber placement are related to cutter operation. A machine vision system detects inconsistencies in tow placement, and timing signals are generated that represent the actuation of the cutters. The timing signals are correlated with recorded images of the placed tows to determine if the inconsistency in tow placement are related to cutter operation.

7 Claims, 8 Drawing Sheets

VERIFICATION OF TOW CUT FOR AUTOMATIC FIBER PLACEMENT

CROSS REFERENCE TO RELATED APPLICATIONS

This application is related to U.S. patent application Ser. No. 11/264,077 filed Oct. 31, 2005; Ser. No. 11/202,411 filed Aug. 11, 2005; Ser. No. 11/264,076 filed Oct. 31, 2005; Ser. No. 11/022,779 filed Jan. 12, 2005; Ser. No. 11/067,031 filed Feb. 28, 2005; Ser. No. 10/904,727 filed Nov. 24, 2004; Ser. No. 10/904,719 filed Nov. 24, 2004; Ser. No. 11/390,244 filed Mar. 28, 2006; Ser. No. 11/383,681 filed May 16, 2006; Ser. No. 11/688,068 filed Mar. 19, 2007; Ser. No. 11/832,831 filed Aug. 2, 2007; and, Ser. No. 11/927,115 filed Oct. 29, 2007, the entire contents of which are incorporated by reference herein.

TECHNICAL FIELD

This disclosure generally relates to equipment for automatically placing composite material tows over a form, and deals more particularly with a method and apparatus for determining whether inconsistencies in tow placement are related to the operation of automated cutters used to cut the tows to length as they are being placed.

BACKGROUND

Composite parts and structures such as those used in the automotive, marine and aerospace industries may be fabricated using automated composite material application machines. For example, automated fiber placement (AFP) machines may be used to produce generally cylindrical or tubular composite parts by wrapping relatively narrow strips of slit composite tape or "tows", collimated into a wider band around a rotating manufacturing tool, such as a mandrel. AFP machines are typically operated by NC (numeric control) or CNC (computer numerical control) controllers which control movement of application heads and ancillary functions, including placing and cutting the fiber tows "on the fly".

In a typical AFP machine application, carbon fiber-epoxy tows are pulled from storage spools or creels in a refrigerated creel house through a set of guides. From the guides, the tows enter a cutter assembly where they are cut to the correct length by knives as the material course, also called a tow band, is laid over a substrate. The substrate may comprise a tool, a mandrel or one or more underlying layers of composite material which have been previously laid down and compacted. Each tow has a dedicated cutting knife, however the number of knives may vary depending upon the number of tows and the width of each tow. As the tows emerge from the cutter assembly, they pass over a compaction roller which applies and compresses the tows onto the substrate surface. Heat may be applied to the tow immediately before it is placed on the substrate in order to increase the tackiness of the resin. Tension is maintained on the tows at all times to assist in pulling them through the AFP machine.

As a tow band is being laid, it is possible one or more tows may be missing from the band due to any of several causes. For example, a creel may run out of tow material, or the tow may break under tension, leaving the free segment to be laid down as a partial segment, or may drop off the substrate entirely. Also, the tow may become jammed in transit through the AFP machine, preventing it from being applied to the substrate. It is also possible that the cutting knife may be actuated prematurely, causing the tow to be cut short. In some applications, tow bands may be narrow by design, which requires that one or more tows be intentionally dropped or cut short. In other applications, a tow band may increase in width from a narrow to a wide region, requiring the addition of tows that have been previously cut and blocked from travel. When an event occurs of the type discussed above, or if a tow is misplaced, it is important to determine the cause, preferably in near real-time.

In-process vision inspection systems have been devised for detecting missing and/or misplaced tows. These inspection systems rely on remote observation of the substrate surface using machine vision technology that may incorporate automated image analysis techniques to identify inconsistencies. The systems may include cameras for monitoring the delivery of the tows for possible breaks or jams. However, none of these prior systems may be effective in quickly determining whether the cutter knives are operating properly, or whether inconsistencies in tow placement are related to cutter knife operation.

Accordingly, there is a need for a system that directly monitors cutting knife operation and correlates missing tows and tow misplacement with cutting knife operation. Embodiments of the disclosure are intended to satisfy this need.

SUMMARY

Embodiments of the disclosure provide direct monitoring of cutting knife operation in a manner that allows an operator to determine, in near real-time, whether the cutting knives are operating normally, and whether inconsistencies in tow placement are related to cutting knife operation. Cutting knife operation is continuously and directly monitored so that malfunctions can be immediately reported to an operator, or used to interrupt or modify the operation of the AFP machine. Images of the tows are recorded as they are being placed on the substrate surface. These images are then correlated with the operation of the cutting knives so that an operator may rapidly, visually associate an inconsistency in tow placement with the operation of a cutting knife responsible for the inconsistency in tow placement.

According to one disclosed embodiment, a method is provided for monitoring the operation of cutters used in an automatic fiber placement machine to cut fiber tows to length. The method may comprise: recording time-related data reflecting the operation of the cutters; recording an image of each tow as the tow is cut and placed; and, associating the recorded data with the recorded images. The time-related data may be recorded by generating a timing signal when a cutter is actuated to cut a tow, sending the timing signal to a processor for processing, and delaying the processing of the timing signal for a length of time sufficient to allow the tow to be placed. Associating the recorded time-related data with the recorded images may be accomplished by placing each of the recorded images adjacent a visual indication of whether or not a cutter that has cut a tow in the adjacent image has functioned properly. The method may further comprise analyzing the recorded images and determining whether an inconsistency exists in the placement of the tow that is related to the operation of a cutter. The analysis may include measuring features of the recorded images that may represent inconsistencies in the placement of the tows.

According to another disclosed embodiment, a method is provided for monitoring the operation of cutters used to automatically cut fiber tows to length in an automatic fiber placement machine. The method may comprise recording an image of at least a portion of a row of tows placed by the machine; recording the point in time when each of the cutters is actuated to cut a tow to length during placement of the tow; using the recorded image to detect whether inconsistencies exists in the placement of the tow; and, determining whether a cutter is responsible for the detected inconsistencies by correlating the point in time that has been recorded with the detected inconsistencies. Detection of inconsistencies may include measuring features in the recorded image that may represent inconsistencies. The results of the feature measurement may be compared with a set of reference standards to determine whether the results reveal inconsistencies. The method may further comprise classifying the detected inconsistencies, and announcing a malfunction in the operation of a cutter based on the classification of the inconsistencies.

According to still another embodiment, a system is provided for monitoring the operation of cutters used to cut tows in a fiber placement machine. The system may comprise image recording means for recording images of tows placed by the machine; means for detecting inconsistencies in the placement of tows using the recorded images; and, means for correlating inconsistencies with the operation of the cutters. The system may further comprise means for detecting the actuation of each of the cutters and for producing timing signals respectively representing the points in time when the cutters are actuated to cut the tows to length. The image recording means may include means for illuminating tows that have been placed, and at least one camera for recording a series of images over time of the tows as the tows are being placed. The illuminating means may include at least one laser, and the correlating means may include a programmed computer employing an image analysis program. The system may further include a user interface including a display for displaying the images recorded by the image recording means, and a plurality of visual indicators for respectively indicating operation of the cutters.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Referring first to FIGS. 1-7, an automatic fiber placement (AFP) machine 20 may be mounted on a robotic arm (not shown) for movement over a substrate 32 which may comprise a tool or mandrel. The AFP machine 20 may include a plurality of creels 24 each containing a length of a relatively narrow strip of composite material, such as a carbon fiber epoxy tow 22. Each of the tows 22 passes through guides 26 which maintain the tows 22 in aligned, parallel relationship as they are fed through a cutter assembly 34. The cutter assembly 34 includes a plurality of reciprocating cutter knives 36 controlled by corresponding, electrically operated actuators 38, which may comprise for example, without limitation, electric solenoids. The actuators 38 force the knives 36 through the tows 22 as the AFP machine 20 moves over the substrate 32. The tows 22 may pass over one or more guide rollers 28 which feed the tow 22 into a nip 33 between a compaction roller 30 and the substrate 32. As the AFP machine 20 moves across the substrate 32, the roller 30 presses the tow 22 against the substrate 32, thereby compacting the tow 22 as it is placed. The cutter knives 36 cut the tows 22 to length, "on the fly". A single pass of the AFP machine 20 over the substrate 32 simultaneously lays down a band 50 (FIG. 5) of parallel tows 22 which may form a single course of a given ply.

A machine vision system 39 is mounted on the AFP machine 20 and functions to detect inconsistencies in the placement of the tows 22. As used herein, the term "inconsistencies" means misplaced tows, missing tows and/or FOD (foreign objects and debris). The vision system 39 may include one or more lasers 40, one or more digital cameras 42 and one or more lamps 44 that provides a source of general surface illumination. The vision system 39 may be mounted on a frame 46 that forms part of a head 35 (see FIG. 3) of the AFP machine 20. In the illustrated embodiment, a pair of laterally spaced lasers 40 provides a line 58 of illumination (FIG. 7) across the tow band 50. A pair of digital cameras 42 may record digital images of the same area of the band 50 in order to create a three dimensional image, or alternatively may record separate images of two adjacent sections of the band 50. Preferably, the cameras 42 are oriented so as to view at least a portion of the tow band 50 that is as close as possible to the compaction roller 30. The cameras 42 function to record a series of successive images of the tows 22, beginning at the point at which the tows 22 are first brought into contact with the substrate 32, and ending after the tows 22 have been cut and fully placed.

Figure 1:
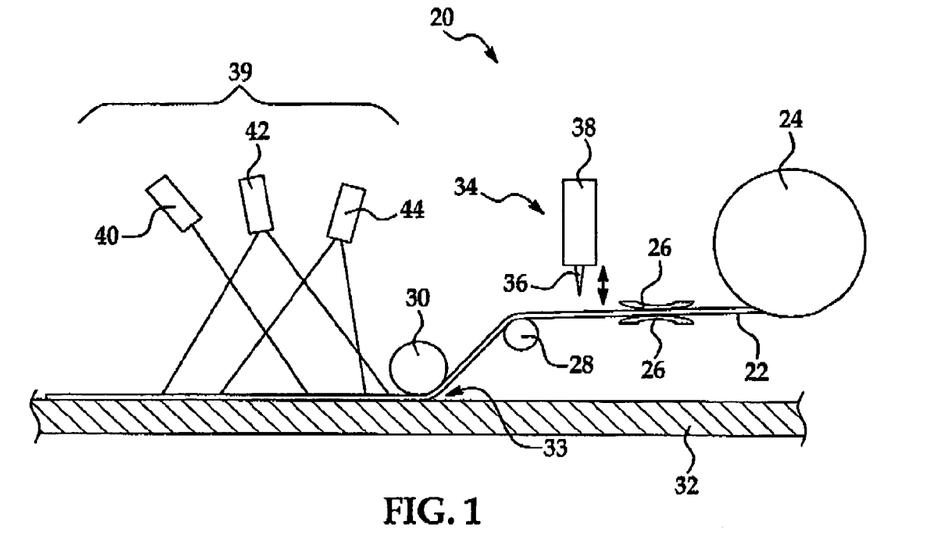
FIG. 1 is a diagrammatic, side view of an automated fiber placement operation, including a system for monitoring the operation of cutter knives.
Figure 2:
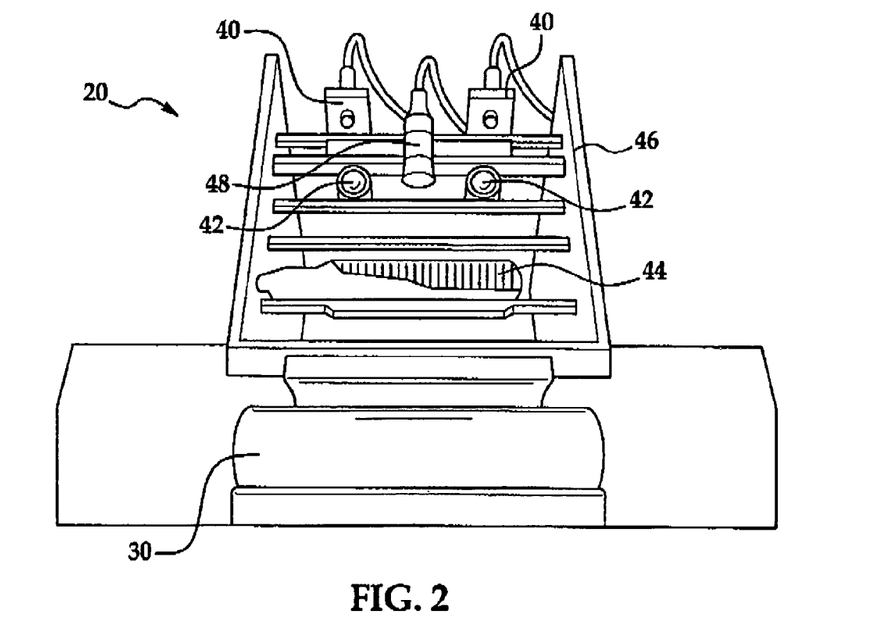
FIG. 2 is a bottom view of an AFP machine, better depicting components of a machine vision system.
Figure 3:
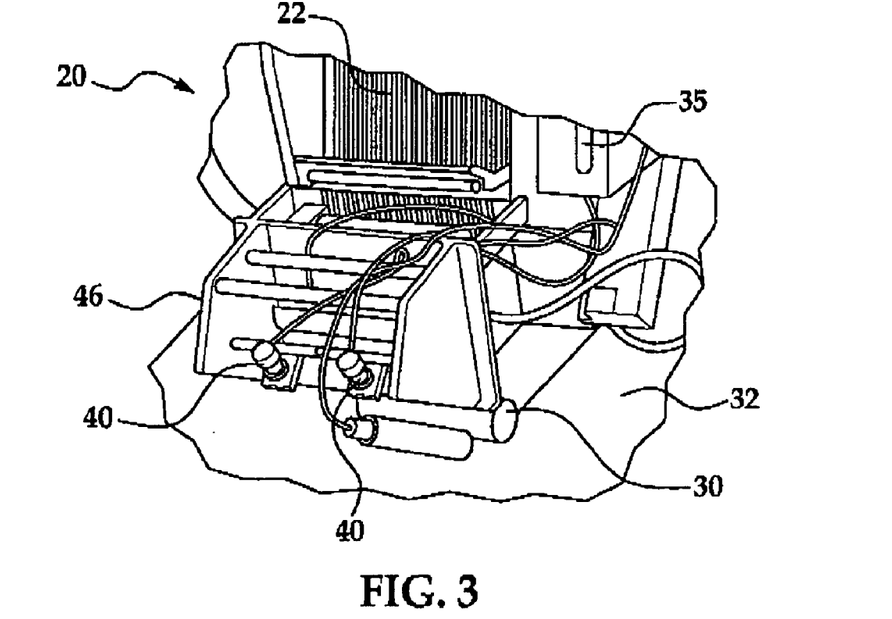
FIG. 3 is a perspective view of an AFP head placing tows on a substrate.
Figure 4:
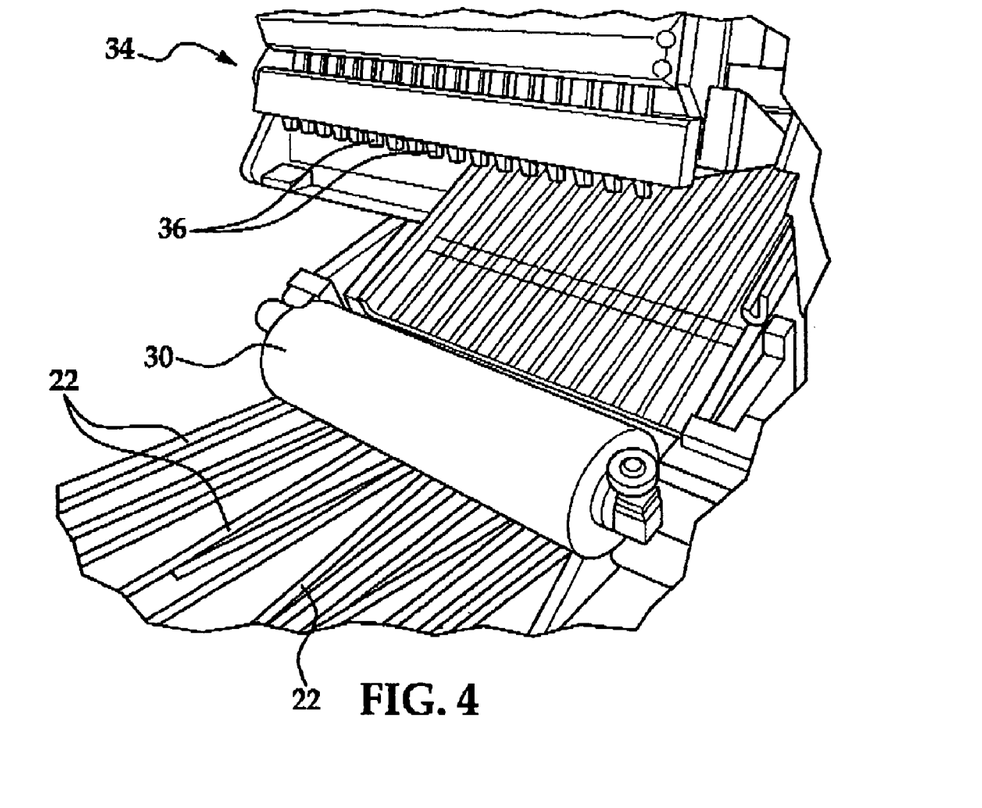
FIG. 4 is a perspective view showing a cutter assembly in an open position and depicting individual knives for cutting the tows.
Figure 5:
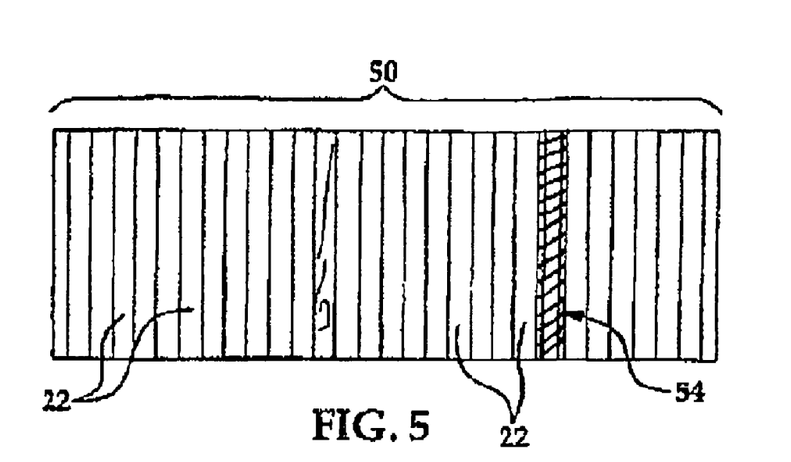
FIG. 5 is a plan view of a recorded image showing a missing tow and an inconsistency in tow placement.
Figure 6:
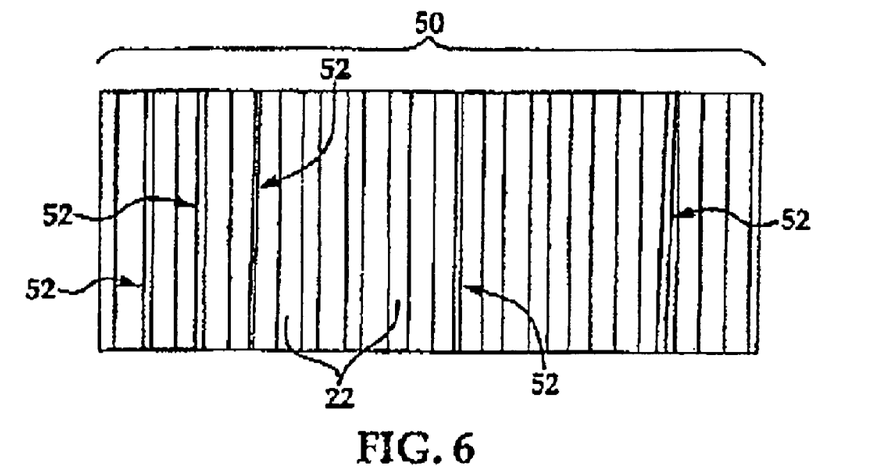
FIG. 6 is a view similar to FIG. 5, but showing other inconsistencies in tow placement.
Figure 7:
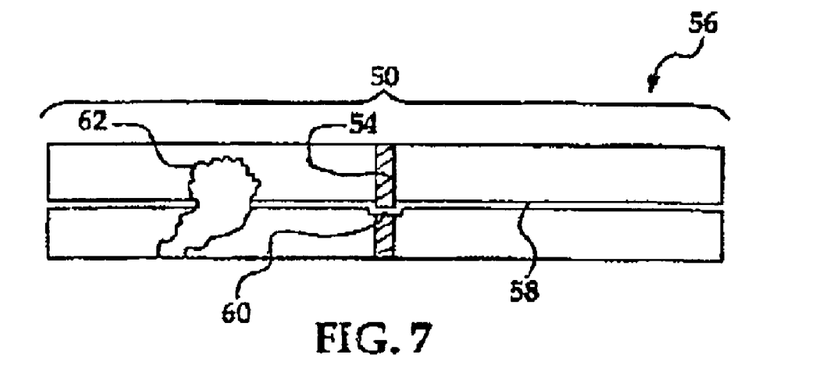
FIG. 7 is a plan view of a portion of a band of tows illustrating the use of reflected laser light to reveal inconsistencies in tow placement.

FIGS. 5 and 6 each illustrate an image of the tow band 50 recorded by the cameras 42 under the general illumination provided by the lamp 44. As seen in FIG. 5, a missing or dropped tow 54 is clearly visible, whereas in FIG. 6, gaps 52 are present between some of the adjacent tows 22 which represent improper tow placement. In FIG. 7, a dropped tow 54 can be detected as an offset 60 in the reflected laser line 58. Additionally, an inconsistency in the form of an FOD 62 can be seen as an interruption in the reflected laser line 58.

Figure 8:
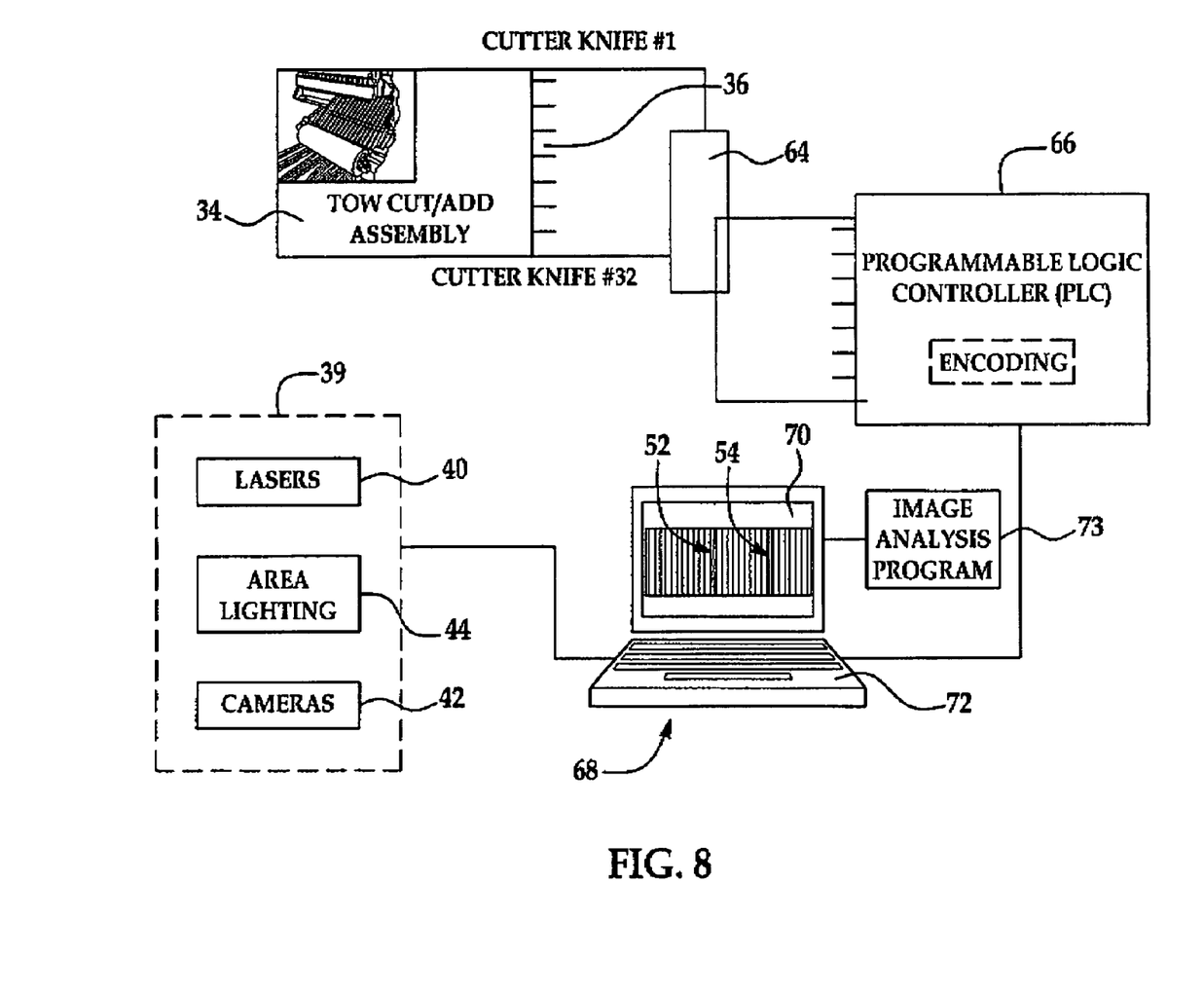
FIG. 8 is a combined block and diagrammatic illustration of a system for monitoring cutting knife operation.

Attention is now directed to FIG. 8 which depicts additional components of the system. A user interface 68 including a programmed computer 72 collects information from the cutter assembly 34 and the machine vision system 39 and functions to detect and report missing or misplaced tows and/or FOD in the placement of the tows 22 that may be related to, or caused by the cutter assembly 34. Each of the solenoid actuators 38 is connected to a control panel 64 adjacent the AFP machine 20. The control panel 64 collects electrical signals used to energize the actuators 38, and sends these signals to a PLC (programmable logic controller) 66. The control panel 64 may introduce a time delay before the actuator signals are delivered to the PLC 66. The amount of this time delay will depend upon the application, however it should be sufficient to allow the cut end of a tow 22 to pass through the AFP machine 20, including the compaction roller 30. In this manner, images of the tow band 50 may be recorded immediately after it has been placed over its entire length. In one embodiment, the timing signals are delayed for a period to allow four inches of tow material to travel through the AFP machine 20 after actuation of the cutter knives 36.

The signals delivered from the control panel 64 to the PLC 66 effectively comprise on/off timing signals which control the actuators 38, and therefore represent time related data reflecting the operation of the cutter knives 36. The PLC 66 functions to encode the actuator timing signals before they are delivered to the computer at 72, so that each signal may be associated with a particular cutter knife 36.

The user interface 68 may include a display 70 for displaying the images recorded by the vision system 39, as well as screens that allow the user to change system parameters and criteria. Two typical screen displays 74, 74a are respectively shown in FIGS. 9 and 10. The user interface 68 displays in real time, the area under inspection, pass/fail status of cutter operation and the criteria being employed in the inspection, and cutter knife operation indicators.

The computer 72 may include software for recording the ply number and course number into inspection records or quality logs. The expected number of plies and courses per ply may be entered by an operator through the user interface 68. The computer 72 may also include an image analysis program 73 which includes standard image processing routines such as, without limitation, edge detection. One suitable image analysis program is commercially available as a package known as the Matrox Image Library. The image analysis program 73 analyzes the recorded images for shape, dimensions and features, and documents rejected indications.

Images of the tow band 50 recorded by the machine vision system 39 are delivered in digital form to the computer 72 where they are correlated with the cutter timing signals relayed by the PLC 66. As will be discussed below, the computer 72 functions to analyze the recorded images and detect missing tows, misplaced tows and/or FOD. The computer 72 then determines, based on the correlated timing signals, whether any of the inconsistencies are related to operation of the cutter knives 36. If the inconsistencies cannot be correlated to the timing of the cutter knife operation, then the cutter knives 36 may be ruled out as the probable cause of the inconsistencies.

When a gap 52 or a dropped tow 54 is detected in the recorded image, then the image analysis program 73 applies a "ruler" to the image in order to measure the width of the gap or other feature representing a possible inconsistency. The measured width is compared to criteria, such as a maximum allowable gap width value that the operator may enter using the user interface 68. If the measured value exceeds the criteria value, then the feature is considered to be out of tolerance which may then be entered into a quality file or quality log report. In the event that the measured gap width equals or nearly equals the full width of a tow 22, then the quality file entry may be listed as a dropped tow. If the dropped tow is correlated to a cutter, then the cutter correlation may be also entered into the quality file to establish a documented operation history.

Figure 9:
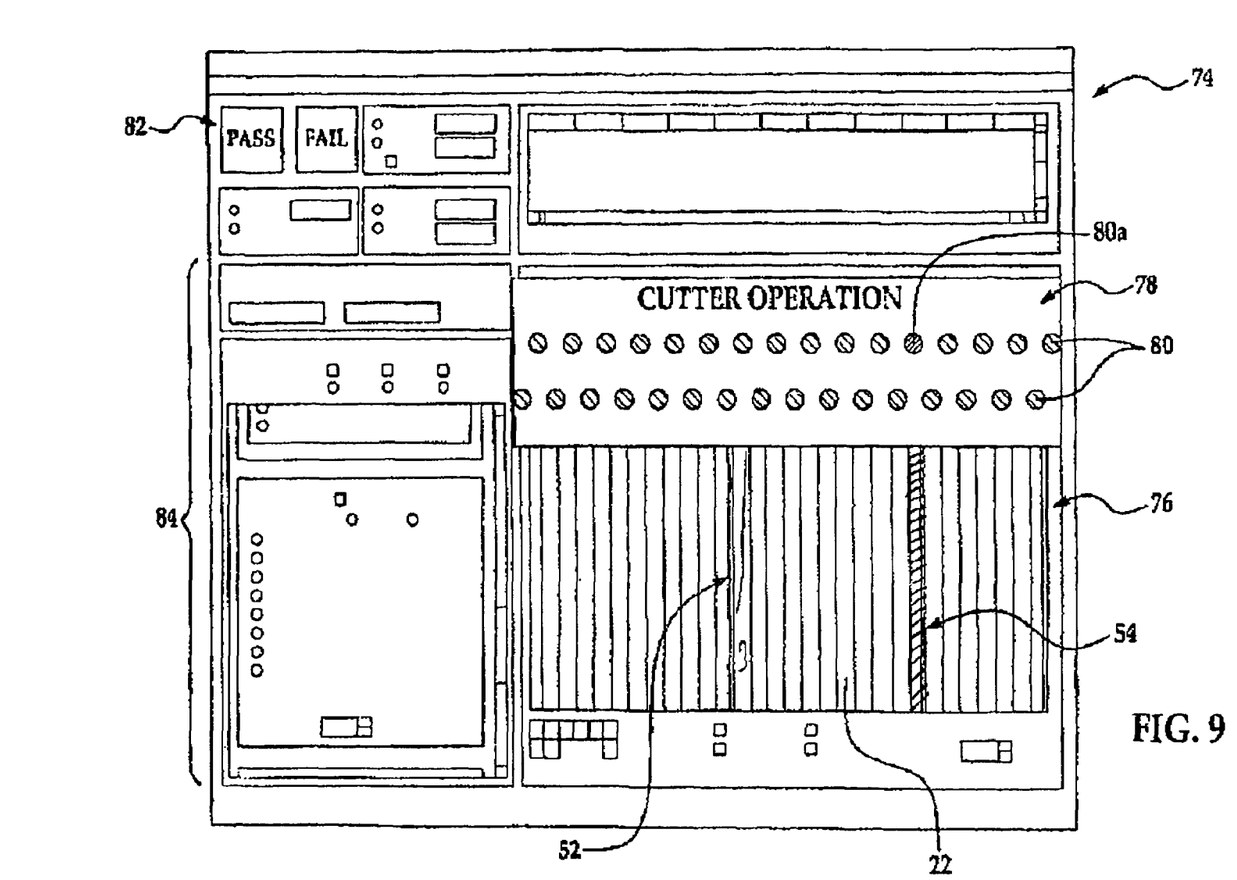
FIG. 9 is a screen capture view of an operator interface display.

Referring now particularly to FIG. 9, the screen display 74 on the computer 72 may include a series of control inputs 84 that allow a user to enter and change parameters, such as acceptance criteria and the image frame size. A "pass-fail" indicator 82 may be provided on the screen 74 which may flash in real time as gaps and dropped tows are detected and measured. An array 78 of colored status indicators 80 may be provided to indicate the operational status of the cutter knives 36. A status indicator 80 is provided for each of the cutter knives 36. The indicators 80 effectively simulate indicator lights and may have a changeable color, for example changeable between red and green. In the illustrated embodiment, green indicators 80 represent satisfactory operation of a cutter knife 36, while a red indicator 80a represents a malfunction in the corresponding cutter knife 36.

Figure 10:
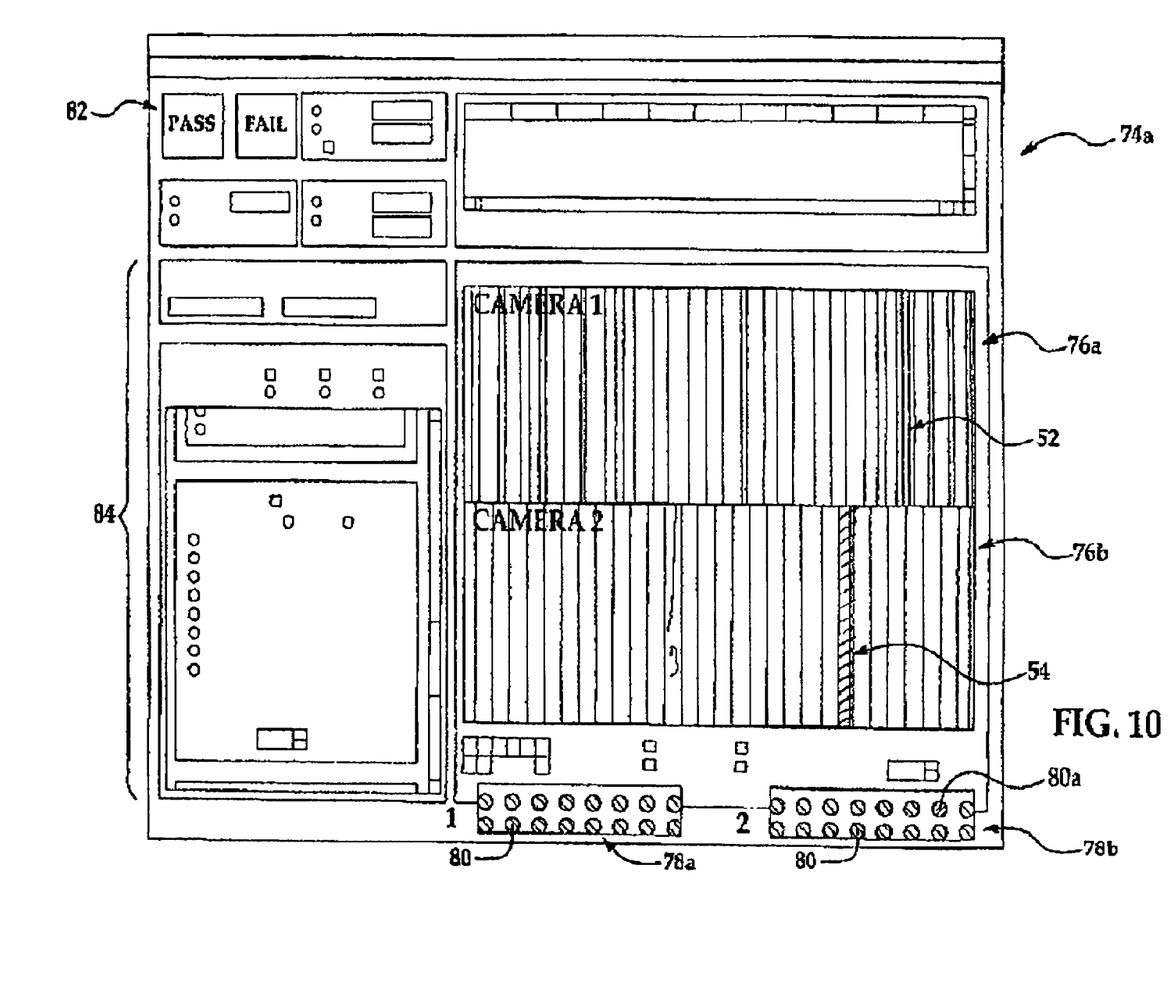
FIG. 10 is a view similar to FIG. 9 but illustrating the display of two bands of tows in a dual channel machine vision system.

The array 78 of indicators 80 is disposed above a display 76 of the image of the tow band 50. In the example illustrated in FIG. 9, the display 76 shows a gap 52 in one of the tows 22, and a dropped tow 54. The status indicators 80 are arranged such that they are respectively vertically aligned with the position of the tows 22. Thus, indicator 80a is vertically aligned immediately above the position of the dropped tow 54, thereby indicating to an operator that the dropped tow 54 may be caused by the operation of a corresponding cutter knife 36. From the forgoing, it can be appreciated that any image of a missing tow 22 is accompanied by an indication 80 of cutter knife operation, thereby either eliminating or confirming the cutter operation as the cause of the missing tow. Accordingly, cutter knife operation is monitored in real time allowing an operator to quickly troubleshoot the manufacturing process FIG. 10 illustrates an alternate screen display layout 74a in which images recorded by two cameras 42 are displayed, respectively representing different areas on the tow band 50. Status indicator arrays 78a, 78b are respectively associated with the images 78a, 78b so that the operator can visually associate an inconsistency in placement of a particular tow 22 with the operational status of the corresponding cutter knife 36.

Figures 11, 12:
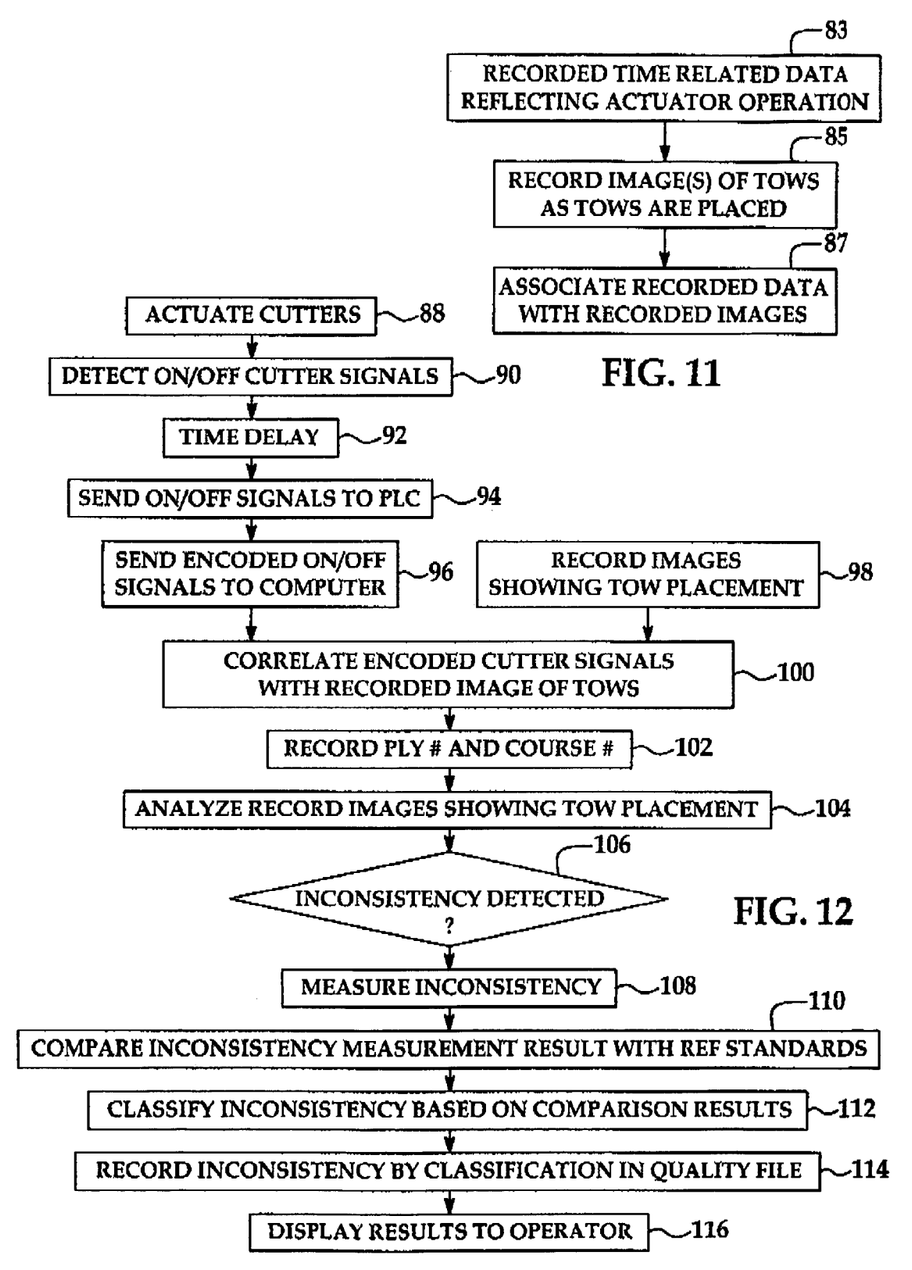
FIG. 11 is a flow diagram illustrating a method for monitoring actuator operation.
FIG. 12 is a flow diagram illustrating a method for monitoring cutter knife operation.

FIG. 11 is an overall block diagram of a method for monitoring the operation of actuators 38 in order to determine whether inconsistencies in the placement of tows 22 may be related to the operation of the actuators 38. Beginning at step 83, time-related data is recorded that reflects the operation of the actuator 38. At 85, one or more images are recorded of each tow 22 as the tow is placed 22. At 87, the time-related data is associated with the recorded images.

Attention is now directed to FIG. 12 which illustrates the overall steps of a method of monitoring the operation of the cutting knives 36 and correlating them to possible inconsistencies in tow placement. Beginning at 88, the cutters 36 are actuated to cut lengths of tows 22. At step 90, the on/off cutter timing signals are detected at the control panel 64 which then introduces a time delay at 92 in order to allow the cut tows 22 to completely pass through the compaction roller 30. Next, at step 94, the timing signals are sent from the control panel 64 to the PLC 66 where they are encoded and then delivered to the computer 72, as shown at step 96. As steps 88-96 are being performed, the machine vision system 39 records, at step 98, successive images of the tow bands 50 which show placement of the tows 22 including inconsistencies such as out-of-tolerance gap widths and dropped tows. The encoded timing signals, as well as the recorded images are delivered to the computer 72 where they are correlated as shown in step 100.

At step 102, the computer 72 may record the ply number and course number, and at step 104, an image analysis is performed to identify potential inconsistencies in tow placement. If potential inconsistencies are detected at 106, then the inconsistencies is measured at 108. At step 110 the inconsistency measurement is compared with reference standards. At step 112, based on the results of the comparison at step 110, the inconsistency is classified according to the comparison results. If the inconsistencies meets the criteria for an inconsistency, then the inconsistencies is recorded in a quality file as shown at step 114 and the results of the inconsistency classification may be displayed to the operator at 116.

It should be noted here that while the system has been disclosed in connection with the monitoring of cutter knife operation, embodiments may be employed to monitor the operation of other actuators or actuatable devices used to process tows in the AFP. For example, the system may employ actuators that operate add rollers or pinch rollers, each of which can affect accuracy in tow placement. Possible inconsistencies in tow placement that are recorded by the cameras 42 may be correlated to the timing of the on/off signals to such actuators.

Figure 13:
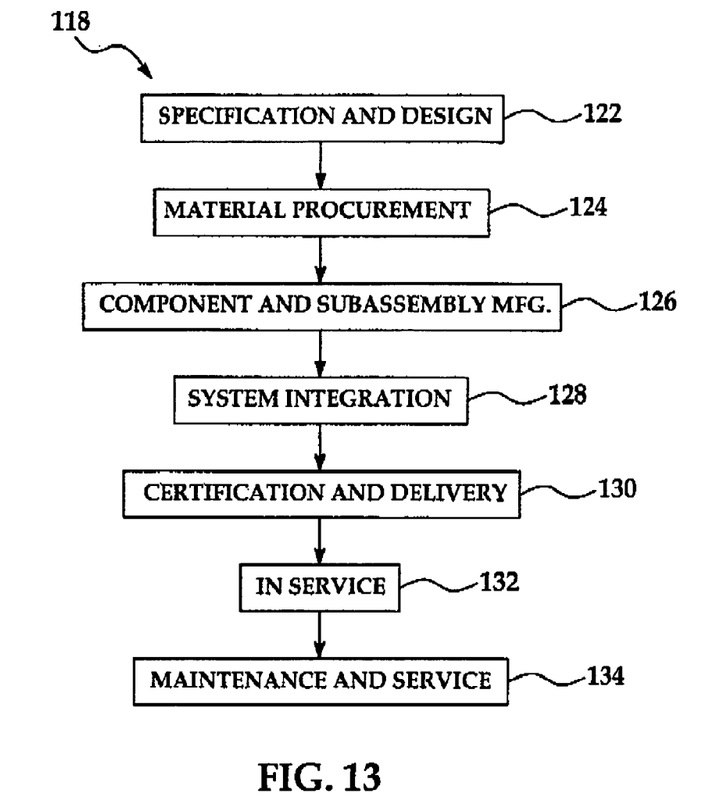
FIG. 13 is a flow diagram of aircraft production and service methodology.
Figure 14:
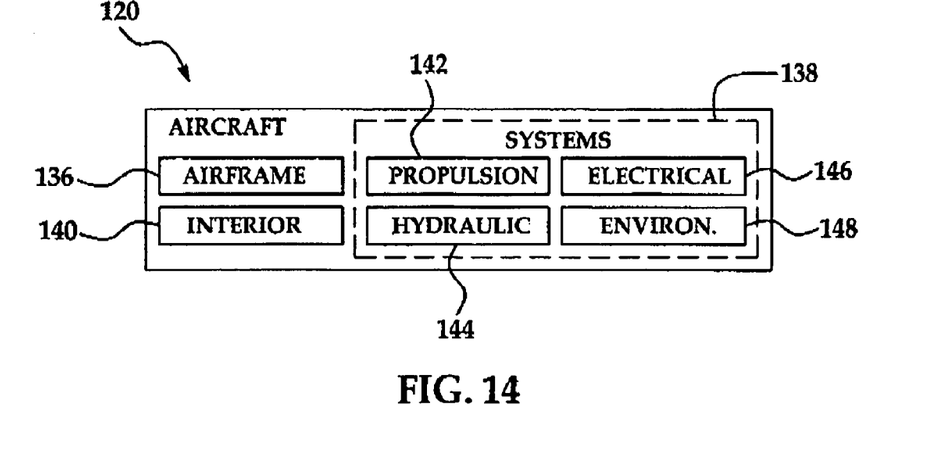
FIG. 14 is a block diagram of an aircraft.

Embodiments of the disclosure may find use in a variety of potential applications, particularly in the transportation industry, including for example, aerospace and automotive applications. Thus, referring now to FIGS. 13 and 14, embodiments of the disclosure may be used in the context of an aircraft manufacturing and service method 118 as shown in FIG. 13 and an aircraft 120 as shown in FIG. 14. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 118 may include specification and design 122 of the aircraft 120 and material procurement 124. During production, component and subassembly manufacturing 126 and system integration 128 of the aircraft 120 takes place. Thereafter, the aircraft 120 may go through certification and delivery 130 in order to be placed in service 132. While in service by a customer, the aircraft 120 is scheduled for routine maintenance and service 134 (which may also include modification, reconfiguration, refurbishment, and so on).

Each of the processes of method 118 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 120 produced by exemplary method 118 may include an airframe 136 with a plurality of systems 138 and an interior 140. Examples of high-level systems 138 include one or more of a propulsion system 142, an electrical system 146, a hydraulic system 144, and an environmental system 148. Any number of other systems may be included. Although an aerospace example is shown, the principles of the disclosure may be applied to other industries, such as the automotive industry.

Apparatus and methods embodied herein may be employed during any one or more of the stages of the production and service method 118. For example, components or subassemblies corresponding to production process 126 may be fabricated or manufactured in a manner similar to components or subassemblies produced while the aircraft 120 is in service. Also, one or more apparatus embodiments, method embodiments, or a combination thereof may be utilized during the production stages 126 and 128, for example, by substantially expediting assembly of or reducing the cost of an aircraft 120. Similarly, one or more of apparatus embodiments, method embodiments, or a combination thereof may be utilized while the aircraft 120 is in service, for example and without limitation, to maintenance and service 134.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of monitoring the operation of an actuator used in an automatic fiber placement machine to process fiber tows, comprising:
   recording time-related data reflecting the operation of the actuator in processing said tows, said actuator operated prior to completed placement of said tows on a substrate;
   recording a digital camera image of each tow as the tow is placed; and,
   associating the recorded data with the recorded images.

2. The method of claim 1, wherein recording the time-related data includes:
   generating a timing signal when the actuator is actuated to process each of said tows,
   sending the timing signal to a processor for processing the timing signal, and
   delaying the processing of the timing signal for a length of time sufficient to allow the tow to be placed.

3. The method of claim 1 wherein said monitoring the operation of an actuator comprises monitoring fiber tows comprising an aircraft subassembly.

4. The method of claim 1, wherein associating the recorded data includes placing each of the recorded images adjacent a visual indication of whether the actuator has functioned properly.

5. The method of claim 1, wherein:
   recording time-related data includes recording a point in time when the actuator is actuated to process each of said tows,
   recording an image includes recording a series of images of the placed tows, and,
   associating the recorded data includes displaying the recorded images adjacent a visual indication representing the operation of the actuator.

6. The method of claim 1, further comprising:
   analyzing the recorded images, and
   determining whether an inconsistency exists in the placement of each of said tows that is related to the operation of the actuator.

7. The method of claim 6, wherein analyzing the images includes measuring features of the recorded images that may represent inconsistencies in the placement of the tows.

* * * * *